(12) United States Patent
Flowers et al.

(10) Patent No.: US 9,959,431 B2
(45) Date of Patent: May 1, 2018

(54) METHOD AND APPARATUS FOR DISPLAYING POTENTIALLY PRIVATE INFORMATION

(71) Applicant: MOTOROLA MOBILITY LLC, Chicago, IL (US)

(72) Inventors: Christian L. Flowers, Chicago, IL (US); Michael E. Gunn, Barrington, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 342 days.

(21) Appl. No.: 14/312,874

(22) Filed: Jun. 24, 2014

(65) Prior Publication Data

US 2015/0082446 A1    Mar. 19, 2015

Related U.S. Application Data

(60) Provisional application No. 61/878,293, filed on Sep. 16, 2013.

(51) Int. Cl.
*G06F 21/84* (2013.01)
*G06F 3/0488* (2013.01)
(Continued)

(52) U.S. Cl.
CPC ............ *G06F 21/84* (2013.01); *G06F 3/0488* (2013.01); *H04L 51/24* (2013.01);
(Continued)

(58) Field of Classification Search
CPC ........ G06F 3/0488; G06F 21/84; G06F 21/62; H04M 1/72519; H04M 3/42382;
(Continued)

(56) References Cited

U.S. PATENT DOCUMENTS

| 8,463,333 | B2* | 6/2013 | Stuivenwold | G06F 1/3203 370/310.2 |
| 8,924,893 | B2* | 12/2014 | Swink | G06F 3/04883 715/702 |

(Continued)

OTHER PUBLICATIONS

Hide SMS & iMessage Previews from the Lock Screen on iPhone, Jul. 2012.*

(Continued)

*Primary Examiner* — Minh Dinh
(74) *Attorney, Agent, or Firm* — Shumaker & Sieffert, P.A.

(57) ABSTRACT

Methods and apparatus for displaying potentially private information are disclosed. A computing device, that is showing a breathing view on its touch screen display, detects a peek request event, such as a swipe on the display. Before allowing the user to see potentially private information in response to the peek request, the computing device determines if the computing device is currently locked and if an increased privacy setting is enabled. If the computing device is not locked, or the increased privacy setting is not enabled (even though the computing device may be locked), the computing device shows a full peek view (e.g., some or all of the text from a recent text message). However, if the computing device is locked, and the increased privacy setting is enabled, the computing device shows a secure peek view (e.g., the number of new text messages, but no text from the messages).

27 Claims, 12 Drawing Sheets

(51) Int. Cl.
- *H04M 3/42* (2006.01)
- *H04L 12/58* (2006.01)
- *H04M 1/725* (2006.01)
- *H04M 1/66* (2006.01)

(52) U.S. Cl.
CPC ... *H04M 1/72519* (2013.01); *H04M 3/42382* (2013.01); *H04M 1/66* (2013.01); *H04M 2203/4581* (2013.01); *H04M 2250/22* (2013.01)

(58) Field of Classification Search
CPC .................. H04M 1/66; H04M 1/673; H04M 2203/4581; H04L 51/24; H04W 12/08
USPC .......................................................... 726/26
See application file for complete search history.

(56) References Cited

U.S. PATENT DOCUMENTS

| | | | |
|---|---|---|---|
| 9,292,310 B2* | 3/2016 | Chaudhri | ............ G06F 9/4443 |
| 2010/0146384 A1 | 6/2010 | Peev et al. | |
| 2012/0060123 A1 | 3/2012 | Smith | |
| 2012/0115435 A1 | 5/2012 | Oren | |
| 2012/0208501 A1 | 8/2012 | Tsuda | |
| 2013/0141349 A1 | 6/2013 | Song et al. | |
| 2013/0222231 A1 | 8/2013 | Gardenfors et al. | |

OTHER PUBLICATIONS

Burgess, Apple iOS 5: Disable Notifications from Displaying on the Lock Screen, 2011.*

07 Security—2013 Notifications Detail, https://sites.google.com/a/motorola.com/2013-notifications-detail/experience-definition/security, Mar. 6, 2013, all pages.

International Preliminary Report on Patentability from International Application No. PCT/US2014/055607, dated Mar. 31, 2016, 8 pp.

International Search Report and Written Opinion of International Application No. PCT/US2014/055607, dated Dec. 4, 2014 11 pp.

Barnett, Shawn, "Palm m100, A new Palm for new markets," Pen Computing Magazine, Inc., Aug. 7, 2000, 7 pp.

* cited by examiner

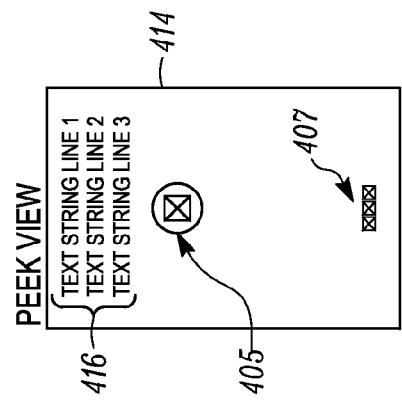
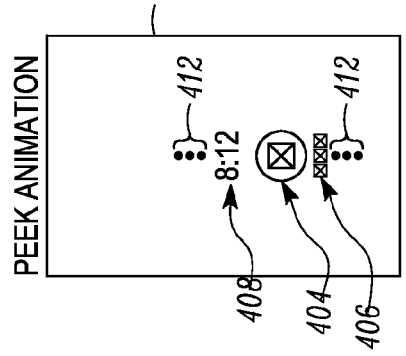
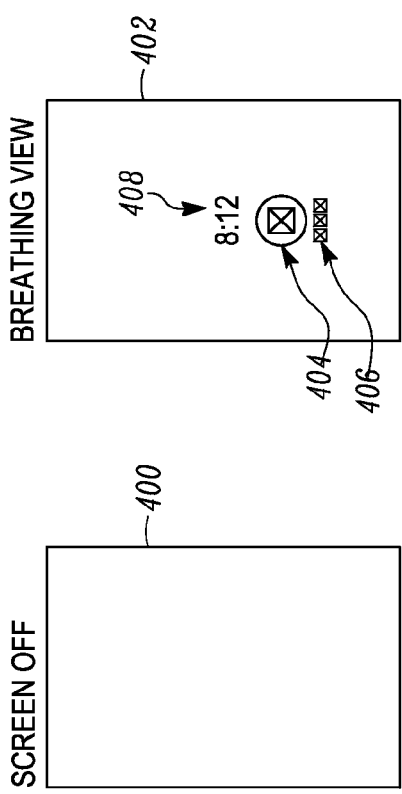
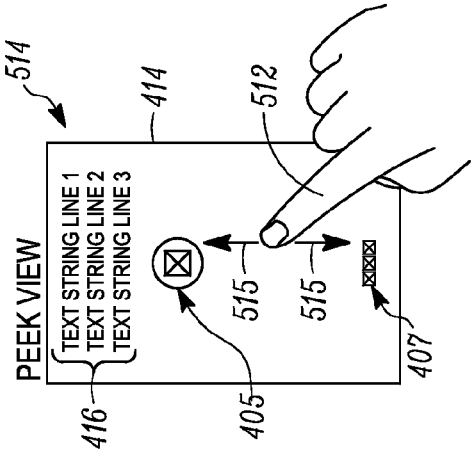
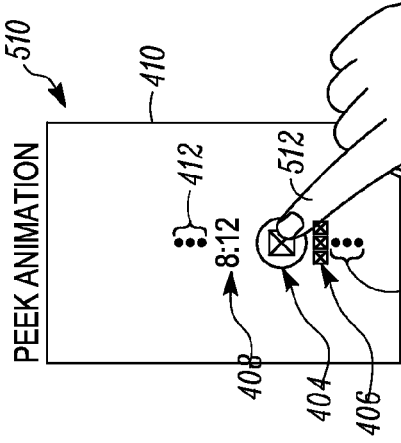
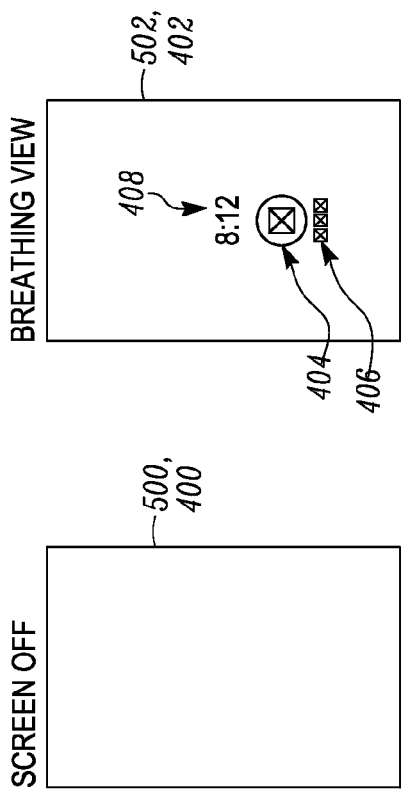

METHOD AND APPARATUS FOR DISPLAYING POTENTIALLY PRIVATE INFORMATION

This application claims the benefit of U.S. Provisional Patent Application No. 61/878,293, filed Sep. 16, 2013.

TECHNICAL FIELD

The present disclosure relates in general to wireless communication, and, in particular, to methods and apparatus for displaying potentially private information.

BACKGROUND OF THE INVENTION

Many computing devices, such as mobile phones, receive various notifications, such as a notification that a new email or text message has arrived. For some locked devices (e.g., where a password, PIN, gesture, etc. is required to gain full access to the device) the user is forced to unlock the device to see the contents of these messages. This can be burdensome when many messages are received and read throughout the day. For other devices, some portion of the received messages may be displayed on the locked device without the burden of unlocking the device. However, some of these messages may include private information and may be accidently or intentionally viewed by other people. In addition, waking a sleeping device to review notifications may consume significant battery power.

BRIEF DESCRIPTION OF THE DRAWINGS

FIG. 4A is a first example view of a touch screen display of a computing device.

FIG. 4B is a second example view of the touch screen display of the computing device.

FIG. 4C is a third example view of the touch screen display of the computing device.

FIG. 4D is a fourth example view of the touch screen display of the computing device.

FIG. 5A is a first additional view.

FIG. 5B is a second additional view.

FIG. 5C is a third additional view.

FIG. 5D is a fourth additional view.

DETAILED DESCRIPTION OF THE PREFERRED EMBODIMENTS

Methods and apparatus for displaying potentially private information are disclosed. A computing device, that is showing a "breathing" view on its touch screen display, detects a "peek" request event, such as a swipe on the display. Before allowing the user to see potentially private information in response to the peek request, the computing device determines if the device is currently locked and if an increased privacy setting is enabled. If the device is not locked, or the increased privacy setting is not enabled (even though the device may be locked), the device shows a full peek view (e.g., some or all of the text from a recent text message). However, if the device is locked, and the increased privacy setting is enabled, the device shows a secure peek view (e.g., the number of new text messages, but no text from the messages).

Figure 1:
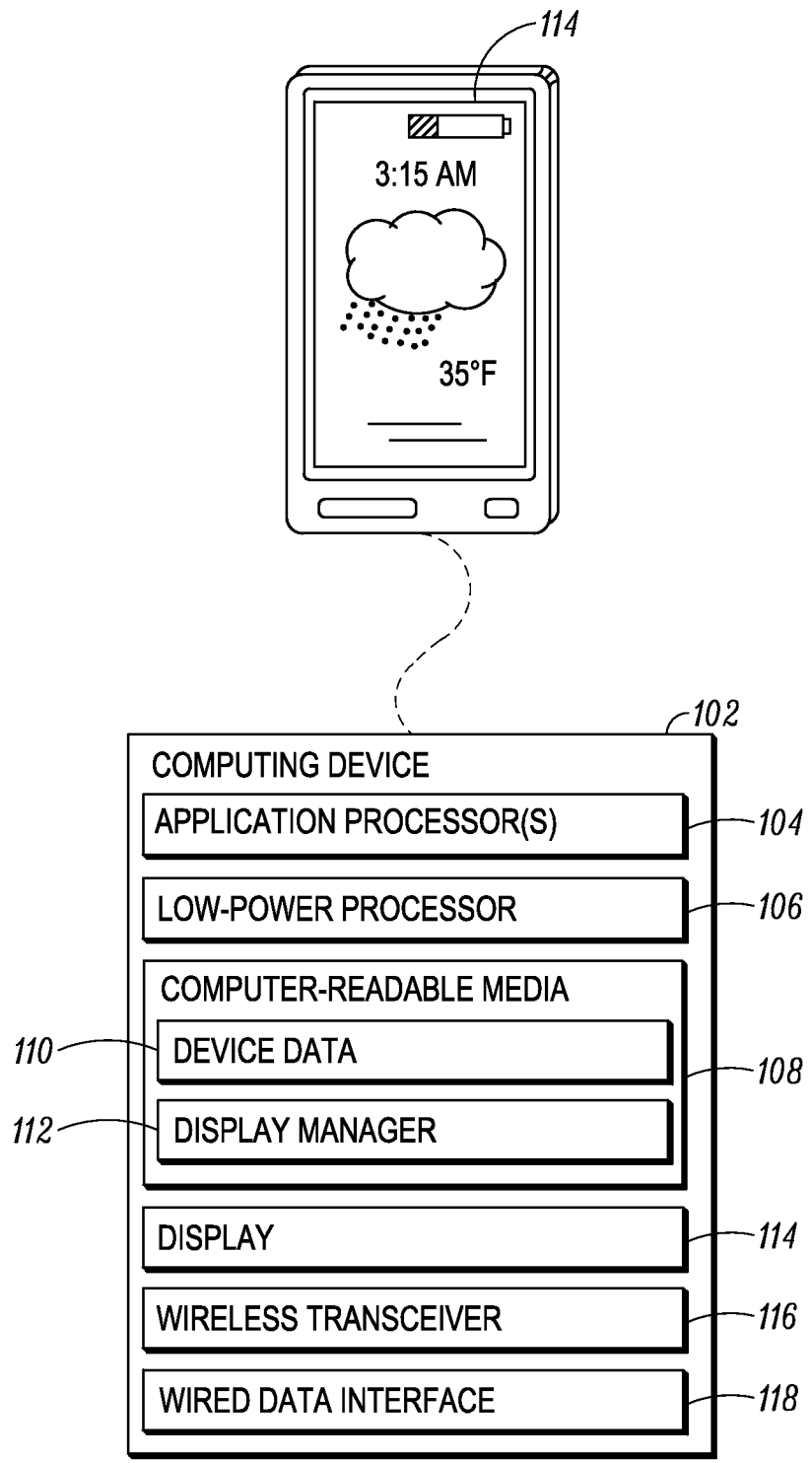
FIG. 1 is a block diagram of an example computing device.

Turning now to the figures, FIG. 1 is a block diagram of an example computing device 102. The example computing device 102 may be any type of portable electronic device, such as a smart-phone, mobile phone, tablet computer, handheld navigation device, portable gaming device, and/or portable media playback device. The computing device 102 includes an application processor 104 and a low-power processor 106. The application processor 104 may be configured as a single or multi-cored full-power processor that includes graphic rendering capabilities. These graphic rendering capabilities allow the application processor 104 to render graphic or display data at high frame rates, and may be provided by a dedicated graphics processing unit (GPU) associated with the application processor 104.

The low-power processor 106 may be configured as a low-power processor or micro-controller that is typically unable to fully render graphic or display data. In some cases, the low-power processor lacks an integrated display controller and/or a display-specific data interface. The low-power processor 106 may be implemented as a reduced-instruction set computing (RISC) processor which has a smaller instruction set, operates at a lower frequency, or has fewer processing capabilities than the application processor 104. For example, when the application processor 104 is configured as a multi-core full-power processor implementing a 32-bit instruction set, the low-power processor 106 may be configured as a RISC-based micro-controller that implements a 16-bit instruction set. The application processor 104 and/or low-power processor 106 may each be implemented separately as disparate component as shown, or implemented together as an application processor with integrated companion micro-controller.

The computing device 102 also includes computer readable-media 108 (CRM 108), which stores device data 110 of the computing device 102. The CRM 108 may include any suitable memory or storage device such as random-access memory (RAM), static RAM (SRAM), dynamic RAM (DRAM), non-volatile RAM (NVRAM), read-only memory (ROM), or Flash memory useful to store the device data 110. The device data 110 may include user data, multimedia data, applications and/or an operating system of the computing device 102, which are executable by the application processor 104 to provide various functionalities of the computing device 102.

The computing device 102 also includes a display manager 112, which, in one implementation, is embodied on the CRM 108 as processor-executable instructions. Alternately, or additionally, the display manager 112 may be implemented in whole or part as hardware logic and/or circuitry integrated with or separate from other components of the computing device 102 (e.g. the application processor 104 or low-power processor 106). An example implementation of the display manager 112 is described further with reference to FIG. 2. In at least some embodiments, the display manager 112 coordinates activities between the application processor 104 and the low-power processor 106.

The computing device 102 includes a display 114 for presenting visual content to users. The display 114 may be configured as any suitable type of display such as a liquid crystal display (LCD) and/or an active-matrix organic light-emitting diode (AMOLED) display. The visual content presented by the display 114 is based on display data received from other components of the computing device 102. This display data is typically received via a display-specific data interface of the display 114, such as a mobile industry processor interface (MIPI), mobile display digital interface (MDDI), DisplayPort, or embedded DisplayPort interface.

The computing device 102 is also capable of communicating data via a wireless transceiver 116 and/or a wired data interface 118. The wireless transceiver 116 may be configured for communication via one or more types of data networks, such as a wireless personal-area-network (WPAN), wireless local-area-network (WLAN), wireless wide-area-network (WWAN), or a cellular network. Example standards by which these networks communicate include IEEE 802.15 (Bluetooth™) standards, IEEE 802.11 (WiFi™) standards, 3GPP-compliant cellular standards, or various IEEE 802.16 (WiMAX™) standards.

The wired data interface 118 may be configured to support any suitable type of wired communication, such as a universal serial bus (e.g., USB 2.0 or USB 3.0), audio, Ethernet, peripheral-component interconnect express (PCI-Express), serial advanced technology attachment (SATA), and the like. In some embodiments, the wired data interface 118 may be operably coupled with a custom or proprietary connector which integrates multiple data interfaces, along with a power connection for charging the computing device 102.

Figure 2:
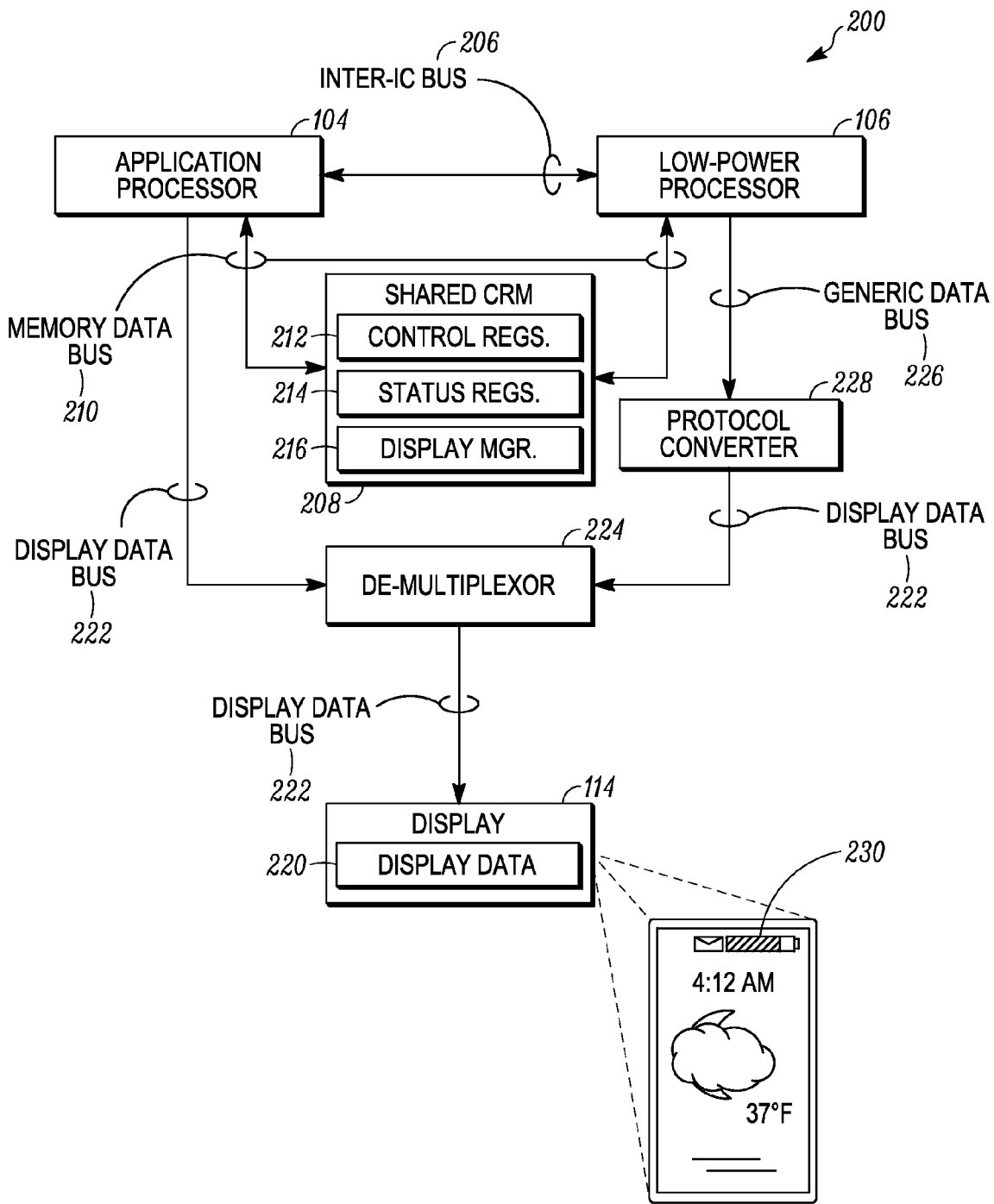
FIG. 2 is a block diagram of another example computing device.

FIG. 2 is a block diagram of another example computing device. As shown generally at 200, the components include an application processor 104 and a low-power processor 106. The application processor 104 can communicate data with the low-power processor 106 via an inter-integrated-circuit bus 206 (inter-IC bus 206) or shared computer-readable media 208 (shared CRM 208).

The inter-IC bus 206 may be configured as any suitable type of data bus, such as an inter-integrated circuit (I2C) compliant bus, IP-block cross bar, general purpose input/outputs (GPIOs), and the like. The application processor 104 and low-power processor 106 can access the shared CRM 208 via memory data bus 210, which may be implemented as separate data buses (e.g., multi-port RAM) or combined. Alternately, or additionally, shared CRM 208 may reside, in whole or part, within one of the application processor 104 or the low-power processor 106.

The application processor 104 or low-power processor 106 may access contents of the shared CRM 208, such as the display co-processing control registers 212 (control regs. 212) and display co-processing status registers 214 (status regs. 214). These display co-processing registers can be utilized to support low-power handover and behavior between the application processor 104 and low-power processor 106. The shared CRM 208 may also include a display manager 216, such as the display manager 112 described with reference to FIG. 1. In this particular example, the display manager 216 is embodied on the shared CRM 208 as processor-executable instructions and/or data. Various aspects of the display manager 216 may be implemented by the application processor 104 or the low-power processor 106 when the processor-executable instructions are respectively executed by either processor.

The components also include a display 114. The display 114 receives display data 220 from the application processor 104 or the low-power processor 106 via a display data bus 222. The display data bus 222 may be compliant with any suitable specification or standard, such as MIPI, MDDI, DisplayPort, or embedded DisplayPort. Generally, these specifications or standards define high-speed serial data channels and may also support a low-power back channel. To simplify connectivity with multiple processors, a de-multiplexor 224 (or similarly configured multiplexor) may be operably coupled between the display 114, application processor 104, and low-power processor 106.

In some embodiments, a protocol converter 228 is implemented between the low-power processor 106 and the de-multiplexor 224 to convert data transmitted via a generic data bus 226 by the low-power processor 106. The protocol converter 228 may be implemented using any suitable combination of software, firmware, and/or hardware, such as a programmable logic device (PLD), field-programmable gate array (FPGA), complex PLD (CPLD), programmable array logic (PAL), and the like.

In some cases, the low-power processor 106 lacks a dedicated display controller or display-specific data interface. In such cases, the low-power processor 106 transmits display data using a generic communication protocol. This generic communication protocol may be compliant with any suitable specification or standard, such as serial peripheral interface (SPI), system management bus (SMBus), or an I2C communication protocol. Alternately or additionally, the protocol converter 228 may emulate handshake signaling or data transfer control operations of a display-specific interface (e.g. MIPI data transfer initiation/termination).

Input selection of the de-multiplexor 224 may be controlled via any suitable signal, such as a GPIO signal of the application processor 104 or the low-power processor 106. In some embodiments, input selection of the de-multiplexor 224 may be controlled by a signal output from the protocol converter 228 such that input selection coincides with initiation or termination of a data transfer from the protocol converter 228 to the display 114.

When a computing device 102 enters a state of low graphical activity, a refresh-frequency of visual content of the display 114 may decrease such that the low-power processor 106 can render the visual content. In some embodiments, the display manager 216 may determine when to transition control of, or access to, the display 114 from the application processor 104 to the low-power processor 106. Prior to entering a state of low graphical activity, the application processor 104 may render and transmit display data 220 to display 114 via the display data bus 222. The display 114 can then present the display data as an entire frame of visual content, such as a background image, battery indicator, time, and date (e.g., display 114 of FIG. 1).

In the context of this example, the display data bus 222 may be configured for MIPI compliant communication of display data (e.g. display bit interface (DBI-2) or display pixel interface (DPI-2)). In some embodiments, the display 114 is configured to maintain the display data in a frame-buffer of the display 114 while the display 114 is in a low-power state. For example, the display 114 may maintain or store the display data in the frame buffer responsive to receiving a MIPI Sleep_In command, at which point the display 114 may enter a low power state.

The application processor 104 can then enter a low-power state to conserver power. In some cases, the low-power state may prevent the application processor 104 from rendering display data because doing so consumes considerable power. In such cases, the low-power state may also permit the application processor 104 to execute background programs or applications, or provide display control data to the low-power processor 106.

The display manager 216 may then cause the application processor 104 to write data to the display control registers 212 that describes a desired alteration of the visual content presented by the display 114. The data may describe an alteration of a parameter of the visual content (e.g., brightness, luminosity, or gamma), timing information for performing the alteration, or a partial region of the display over which the alteration is to be performed. This data or control information may be used by the low-power processor 106 to render meaningful, slow changing visual content, such as "heartbeat" indications or other contextual alterations of the visual content (e.g., battery status or charge level). Heartbeat indications may for example comprise periodic display of information on an otherwise blank ("OFF") display panel. In this particular example, the alteration of the visual content may reflect a change in a charge level of a battery, such as a battery icon 230. Alternately or additionally, any of the graphics or icons illustrated in FIGS. 1 and/or 2 may be updated using various embodiments of display co-processing. The visual content may include displaying received email or text message alerts, meeting notice alerts, or other content pertaining to the computing device 102 while the computing device 102 is in a lower power state.

Once the data is written to the display control registers 212, the display manager 216 transfers control of the display 114 to the low-power processor 106. The display manager 216 may do so by sending a wake request or notification to the low-power processor 106, such as through a general purpose input/output (GPIO) of the application processor 104. Alternately or additionally, the display manager 216 switches the input selection of the de-multiplexor 224 to receive data from the low-power processor 106 instead of the application processor 104. The low-power processor 106 then generates additional display data based on the data stored in the display control registers 212. This additional display data may not be sufficient to over-write an entire frame-buffer of the display 114, yet may be useful to alter at least a portion of the visual content presented by the display 114. The low-power processor 106 then transmits the additional display data to the protocol converter 228 via the generic data bus 226. The generic data bus 226 may be configured as an SMBus and a data port of the low-power processor 106 may be configured for SMBus compliant communication.

The protocol converter 228 then converts the additional display data from the SMBus format to a display-specific communication protocol, in this case to MIPI compliant display data. The additional display data is then transmitted by the protocol converter 228 to the display 114 via the de-multiplexor 224. Once received by the display 114, the additional display data is written into the display data 220 effective to alter the visual content presented by the display 114. Having altered the visual content presented by display 114, low-power processor 106 can update the display status registers 214 to track a current state of alterations of the visual content. The application processor 104 may also access the display status registers 214 to determine whether the low-power processor successfully altered the visual content or to determine whether to request further alterations.

Figure 3:
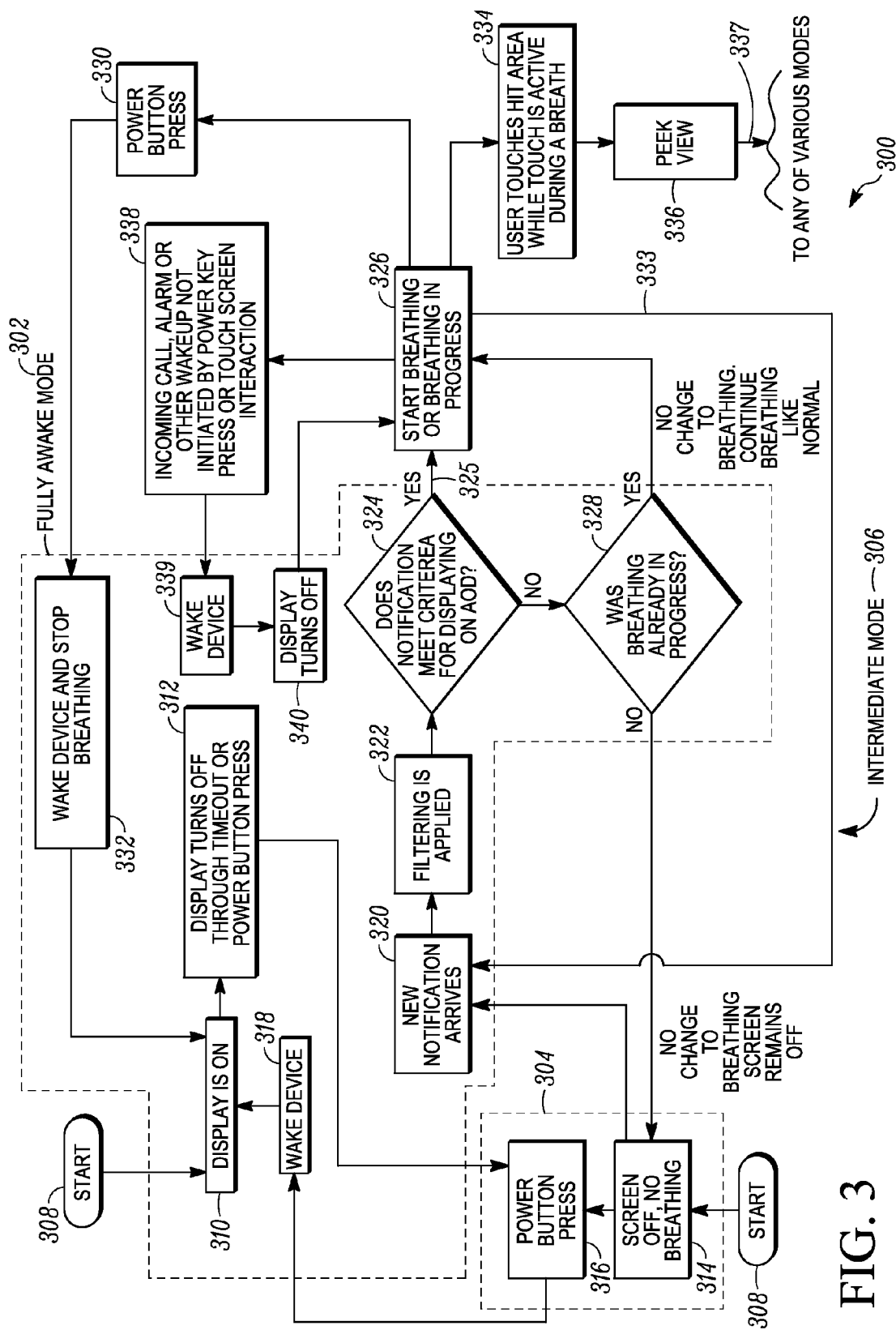
FIG. 3 is a flowchart of an example process for transitioning a computing device between various power modes.

Referring now to FIG. 3, a flowchart 300 shows an example process 300 for transitioning a computing device 102 between various power modes. The process 300 may be carried out by one or more suitably programmed processors such as a CPU executing software. The process 300 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 300 is described with reference to the flowchart illustrated in FIG. 3, it will be appreciated that many other methods of performing the acts associated with process 300 may be used. For example, the order of many of the operations may be changed, and some of the operations described may be optional.

The flowchart particularly illustrates example steps of operation of the computing device 102 as the computing device 102 proceeds among different operational modes or states, mainly, a "fully awake" or "on" mode of operation during which the processors 104, 106 are operating (that is, the application processors are up and running), an "off" mode of operation, and an "intermediate" mode of operation during which breathing and peeking processes occur or can occur. Although in the present embodiment the processors 104, 106 are off or powered-down during the off mode and intermediate mode of operation (by contrast to operation in the fully awake mode, during which the processors 104, 106 are up and running), as will be described further below it is still possible for the computing device 102 to operate during one or both of the off mode and intermediate mode in manners that involve some display functionality by the touch screen display 114 (including potentially both outputting of information and receiving of inputs). Such operation of the touch screen display 114 during the intermediate mode and/or off mode is achieved by virtue of control functionality provided by the low power processor 106.

More particularly, in FIG. 3, portions of the process 300 represented by the flow chart 300 that occur in the fully awake mode are shown within a fully awake mode region 302, and portions of the process 300 that corresponds to the off mode are shown in an off mode region 304. This being the case, it should further be appreciated that all of the remaining portions of the process 300 shown in FIG. 3, excluding the portions shown in the regions 302 and 304, are portions of the process 300 that are performed during the intermediate mode of operation, and are referred to as being within a region 306 shown in FIG. 3. It should further be appreciated that, generally speaking, operation in the fully awake mode is associated with a normal power mode of the processors 104, 106 and/or a substantially active mode of those processors 104, 106. By contrast, the intermediate mode of operation and off mode of operation are associated with a low power (or even completed powered-off) mode of the processors 104, 106 and/or a substantially inactive mode of those processors. Given the above, the intermediate mode of operation can also be referred to as an "Always on Display" mode (AoD) mode or "sleep" mode (and/or the off mode potentially can also be encompassed generally within the "sleep" mode), in contrast to the fully awake mode, which can also be referred to as a "non-sleep" mode.

Additionally, as will be described further below, in at least some embodiments disclosed herein, one or more notifications can be displayed by the computing device 102 in a "non-sleep" mode such as the fully awake mode and also one or more notifications can be displayed by the computing device 102 in a "sleep" mode such as the intermediate or AoD mode (including submode portions thereof as described). In at least some such embodiments, the notifications provided in the fully awake mode or "non-sleep" mode are notifications received during operation in that mode, and that are displayed by way of activation of the entire, or substantially the entire, display screen (e.g., full screen information is displayed, where the full screen information includes data corresponding to substantially all pixels capable of being displayed by the display). Further in such embodiments, in contrast, the notifications provided in the intermediate mode or "sleep" mode are notifications received during operation in that mode, and that are displayed by way of activation of only a portion or portions of the display screen (particularly portion(s) that are substantially less than the entire display screen and/or display substantially less that the full screen information, that is, information corresponding to less or substantially less than all pixels capable of being displayed by the display).

Further referring to FIG. 3, as indicated by first and second start regions 308, the process 300 represented by the flow chart 300 can begin either in the fully awake mode or the off mode. Operation in the fully awake (or on) mode begins particularly with a step 310, at which the touch screen display (or other display screen) 114 is on. It should be understood that, during such fully awake mode operation, the computing device 102 can (and typically does) receive one or more notifications. Such notifications can take any of a variety of forms including, for example, email messages, short message service (SMS) text messages, various updates or alerts, or other forms, and such notifications can be received at the computing device 102 in any of a variety of manners including, for example, by way of wireless signals received via the wireless transceivers 116 from other computing device 102s such as remote devices (not shown). In response to receiving such notifications, or signals or other information giving rise to notifications, in the fully awake mode, the computing device 102 typically will display notifications on the touch screen display 114 corresponding to the received notifications, signals, or information. Such display, under the control of the processors 104, 106, typically involves actuation of the entire touch screen display.

Nevertheless, at some point during the operation of the computing device 102 in fully awake mode, as represented by a step 312, the touch screen display can turn off as a result of a timeout (a the passing of a predetermined amount of time during which no activity or activities of predetermined type(s) have occurred), as a result of a toggle button pressed by the user, or as a result of other condition(s) being met. When this occurs, the process 300 then advances to a step 314, at which the off mode is entered and the touch screen display 114 remains off (to be clear, at this step in the off mode, no breathing or other intermediate mode functionality is performed). It should further be noted that the process 300 represented by the flow chart can also begin, as indicated by one of the start regions 308, at this step 314 as well, which reflects the possibility that the process 300 starts at a time when the computing device 102 is already in the mode.

Further as shown, if a power button press occurs at a step 316 while the screen is in the off mode, then the computing device 102 can return to the fully awake mode, by proceeding from the step 316 to a step 318, at which the computing device 102 is awakened, after which the process 300 again returns to the step 310 at which the touch screen display 114 is on. Alternatively, however, if while the computing device 102 is in the off mode and the touch screen display 114 is off at the step 314 and a new notification arrives as represented by a step 320, then the computing device 102 also re-enters the fully awake mode. As already discussed above in regards to the step 310, depending upon the embodiment or circumstance the received notification can take any of a variety of forms. Further, upon receipt of a new notification at the step 320, then at a step 322 filtering is applied by the computing device 102 to determine whether or not the received notification satisfies one or more criteria such that the notification is appropriate for being displayed in any particular manner.

The filtering that is performed at the step 322 can vary depending upon the embodiment or circumstance. For example, in some embodiments, certain types of notifications are "blacklisted", that is, automatically determined to be not worthy of triggering operation of the computing device 102 that would result in immediate display of those items. In some such embodiments, some or all of the rules defining what types of notifications are "blacklisted" can be static, but in other embodiments, some or all of the rules are user-modifiable (e.g., modified by a user of the computing device 102 through a settings feature of the computing device 102). Also, in some such example embodiments, the rules are global in terms of the rules impacting whether the notification is synced to all end points (e.g., a phone, a watch, a personal computer operating a browser such as Chrome browser available from Google, Inc. of Mountain View, Calif.), but in other such example embodiments the rules are not global. Further for example, in some embodiments certain types of notifications are "whitelisted", that is, automatically determined to be worthy of triggering operation of the computing device 102 that would result in immediate display of those items.

Further, in regards to such filtering, it should also be appreciate that the filtering that is performed varies depending upon whether the computing device 102 is operating in the fully awake mode, in the intermediate mode, or in the off mode. Indeed, more generally, the filtering that is performed can vary generally with respect to the mode of operation of the computing device 102, and it should be understood that the present disclosure envisions the possibility of embodiments (and encompasses embodiments) in which there are more modes of operation of the computing device 102 other than the fully awake mode, intermediate mode, and off mode, and also envisions that the modes of the computing device 102 can include "sub-modes" corresponding to operations that constitute sub portions of the functionality associated with any given mode of operation—for example, modes such as a breathing mode of operation and a peek view mode of operation can be considered to be sub-modes encompassed by the intermediate mode as discussed in further detail below. Notwithstanding the particular terminology used here in to refer to various modes (and sub-modes), it should be appreciated that other terminology can also be chosen to refer to these modes (and sub-modes) as well. For example, it is possible that the term "breathing mode" can be used to refer to all functionality described herein as being associated with the "intermediate mode", including "peek view mode" operation, and that the particular functionality associated with the "breathing mode" as described herein can be referred to in a different manner.

(Nevertheless, for purposes of the description provided herein, the "intermediate mode" encompasses the "breathing mode" and "peek view mode" operation).

Additionally, it should be appreciated that filtering can encompass numerous different types of filtering steps and processes depending upon the embodiment or circumstance including, for example, a variety of different type of rule application steps, ranking steps, and/or steps involved with processing or mining data (e.g., analyzing or cross-referencing strings of text or detecting names in various text strings) packages, or applications.

Subsequent to (or as a conclusion of) the step 322, as further represented by a step 324, the computing device 102 determines whether, based upon the filtering, the received notification does meet one or more criteria for display in the intermediate mode (or AoD mode as noted above). If so, the process 300 leaves the fully awake mode and enters the intermediate mode as indicated by an arrow 325 crossing out of the fully awake mode region 302 and entering the intermediate mode region 306. More particularly, upon entering the intermediate mode region 306, the process 300 particularly reaches a step 326 at which breathing operation is begun (or, if already being performed, continues to be performed).

Alternatively, if at the step 324 it is determined that the received notification does not (based upon the filtering of the step 322) meet the criteria for display in the intermediate mode, then the process 300 advances from the step 324 to a step 328. At the step 328, it is determined by the computing device 102 whether breathing operation (in accordance with the breathing mode) was already in progress and being performed. If breathing operation was already in progress, then the process 300 advances from the step 328 back to the step 326, and the breathing operation already going on continues on with no change, that is, the computing device 102 continues unabatedly to perform breathing operation like normal. However, if at the step 328 it is determined that the breathing operation was not already in progress, then the process 300 returns from the step 328 back to the step 314 such that the process 300 returns to the off mode and particularly the touch screen display 114 is off and no breathing is occurring (accordingly, there is no change to the breathing operation and the screen remains off).

As additionally shown in FIG. 3, when the computing device 102 has reached the step 326 of the intermediate mode so as to be operating in the breathing mode, breathing operation can then continue on indefinitely. Nevertheless, there are several actions or events can occur that cause the breathing operation to be stopped and/or to cause the mode of operation to change. First, as shown in FIG. 3 by a step 330, if a power button press is received at the computing device 102, then the computing device 102 returns to the fully awake mode and particularly the process 300 advances to a step 332 within the fully awake mode region 302 in which the computing device 102 is awakened (and particularly the processors 104, 106 are powered on) and accordingly the breathing operation of the step 326 is ended. Such a power button press operation can also be considered a "home button" press, if one views the fully awake mode as a "home" mode. Following the step 332, the process 300 then additionally returns to the step 310, at which the touch screen display 114 is on (and received notifications are displayed thereon).

Alternatively, as represented by an arrow 333 linking the step 326 to the step 320, it is also possible during the breathing operation of the step 326 that a further new notification is received by the computing device 102, as represented again by the step 320. If this occurs, then the process 300 again advances through the steps 320, 322, 324, and possibly the step 328, after which the process 300 returns to the step 326. That is, when a new notification is received, ultimately the breathing operation of the step 326 continues, either because the received notification meets the criteria for being displayed in the intermediate mode as determined at the step 324, or because breathing operation has already been in progress as determined at the step 328. It should be appreciated that, although the steps 320, 322, 324, and 328 are shown to be encompassed within the fully awake mode region 302, it is possible in alternate embodiments that these steps of receiving a new notification when the computing device 102 is in the breathing mode and filtering and responding to the new notification can all be performed as part of the intermediate mode of operation, in at least some alternate embodiments.

Additionally as shown in FIG. 3, in some circumstances, during the breathing operation of the step 326, a user can touch a "hit area" on the touch screen display 114, particularly at a time when the touch is active during a breath. If such a touch occurs at a step 334, then the process 300 advances to a step 336, in which the computing device 102 remains in the intermediate mode (AoD mode) of operation but in which a peek view can occur. Such peek view operation represented by the step 336 can be considered to constitute a peek view mode of operation that is a submode of the intermediate mode (the transition step 334 at which the user touches the hit area can be considered to be part of either the breathing mode or the peek view mode). Execution of operations as part of the peek view mode as represented by the step 336 can ultimately result in the process 300 returning to any of a variety of modes, as represented by an arrow 337 of FIG. 3, including the breathing mode (corresponding to the step 326), the fully awake mode, or the off mode.

Finally, it is also possible that during operation in the breathing mode corresponding to the step 326 that an incoming call, alarm, or other wakeup event not initiated by a power key (or button) press or touch screen interaction or encompassed within the notifications addressed by the step 320 (in other words, some other type of notification that does not correspond to any of the steps 320, 330, or 334) will occur. If such an event occurs, then the process 300 advances to a step 339 at which the computing device 102 is awakened and the fully awake mode region 302 is reached again. However, subsequent to the step 339, if there occurs a time at which the touch screen display 114 turns off as represented by a step 340, then the process 300 returns back to the intermediate mode and particularly to the step 326 and breathing again resumes.

Referring now to FIGS. 4A, 4B, 4C, and 4D, respectively, first, second, third, and fourth example views of the touch screen display 114 of the computing device 102 are shown that are intended to illustrate example operation of the touch screen display 114 in displaying images during various portions of the process 300 represented by the flow chart of FIG. 3, particularly during the breathing and peek view modes encompassed the intermediate mode (the portions of the process 300 corresponding to the intermediate mode region 306). FIG. 4A particularly shows a blank image 400

That appears when the touch screen display 114 is completely off. The blank image 400 appears at particular times during breathing operation corresponding to the step 326.

By contrast, FIG. 4B shows a breathing view image 402 that, rather than being blank, instead includes one or more image portions that are displayed by the touch screen display 114, and which the present example particularly include an icon 404 that can constitute a hit area that can be touched by a user during operation in the breathing mode (e.g., at the step 334 of FIG. 3), additional icons 406 that may optionally constitute an additional hit area (or areas), and a time display 408. The breathing view image 402 does not remain consistently on at all times during operation in the breathing mode, but rather periodically becomes visible and then disappears (at which times the touch screen display 114 again takes on the blank image 400 of FIG. 4A. In some embodiments, the breathing view image 402 may be displayed in response to some event other than a periodic timer. For example, the user may activate an accelerometer and/or proximity sensor by nudging the computing device 102 and/or or waving near the computing device 102.

Next, with respect to FIG. 4C, a peek animation image 410 is illustrated. As shown, the peek animation image 410 also includes one or more image portions that are displayed by the touch screen display 114, and more particularly in this embodiment these one or more image portions include not only all of the image portions shown in FIG. 4B (namely, icon 404, icons 406 and time display 408) but also additionally include animation features 412, which in the present example include upper and lower (that is, above the time display 408 and below the icons 406) vertically-extending columns of three dots. As further discussed below, the animation features 412 particularly are displayed by the touch screen display 114 during transitioning between a time during the breathing mode at which a touch can be received (e.g., a time at which the breathing view image 402 shown in FIG. 4B is displayed), and a time at which the peek view mode has been fully entered and a peek view image such as an example image shown in FIG. 4D is displayed. As with the step 334 of FIG. 3, the displaying of the peek animation view of FIG. 4C can be considered either as part of the breathing mode or as part of the peek view mode.

Additionally, with respect FIG. 4D, the peek view image 414 shown therein is an example of an image that can be displayed by the touch screen display 114 once peek view mode has been entered. As shown, the peek view image 414 no longer includes the exact same arrangement of image portions shown in the peek animation image 410, albeit some of the image portions are the same in terms of their respective appearances. More particularly, the peek view image 414 in contrast to the peek animation image 410 no longer has the animation features 412 or time display 408, but continues to have an icon 405 identical in appearance to the icon 404 and icons 407 identical in appearance to the icons 406, except insofar as the icon 405 is now at a location that is moved upwards relative to the location of the icon 404 in the peek animation view (above the location of the uppermost dot of the upper column of dots of the animation features) and the icons 407 are now at a location that is moved vertically downward relative to their previous location in the peek animation view (below the location of the lowermost dot of the lower column of dots of the animation features).

Further, in the peek view image 414, one or more (in this example, three) text string lines 416 are also displayed, above the icon 405. The text string lines 416 can include message information or information corresponding to one or more past notifications received by the computing device 102. The display of these text string lines thus allows the user to "peek" at the notifications that have been received (e.g., recently received) by the computing device 102, and is therefore the feature of this manner of operation giving rise to the "peek view mode" terminology used herein.

Referring additionally to FIGS. 5A, 5B, 5C, and 5D, first, second, third, and fourth additional views 500, 502, 510, and 514, respectively. The first, second, third, and fourth additional views 500, 502, 510, and 514 respectively encompass the respective blank, breathing view, peek animation image, and peek view images 400, 402, 410, and 414 that are shown in FIGS. 4A, 4B, 4C, and 4D, respectively, but also show those images in combination with illustrations of a user—particularly a finger 512 of the user's hand—interacting with those images. Because it is envisioned that the finger 512 of the user has not yet approached the touch screen display in the case of the blank image 400 and breathing view image 402, the first additional view 500 of FIG. 5A merely again shows the blank image 400, and the second additional view 502 of FIG. 5B merely again shows the breathing view image 402. By contrast, with respect to the third additional view 510 of FIG. 5C, there it is envisioned that the user has already touched the touch screen display 114 with the user's finger 512 and this has given rise to display of the peek animation image 410. In particular, it should be noted that the finger 512 is touching on the icon 404, which constitutes one of the hit areas on the touch screen display 114 in this example. Further, it is because of (in response to) the user's finger 512 touching the hit area that animation features 412 are shown to have appeared (the animation features progressively appear as a response to the touching of one of the hit areas).

Finally, at FIG. 5D, the fourth additional view 514 shows the peek view image 414 of FIG. 4D and also again shows the user's finger 512 to still be proximate to and/or touching the touch screen display 114. As represented by arrows 515, while in the peek view mode of operation, the user can further provide a gesture (or gesture portion) so as to actuate the computing device 102 to perform one of several different actions or transition to any of several different modes. In the present example, gestural actuation of the computing device 102 in this regard particularly is not accomplished until, in addition to originally touching down on one of the target hit areas (again, in this example, one of the icons 404 and 406) during the breathing mode of operation, the user then further: (i) continues to continuously touch that hit area during the transitioning from the breathing mode to the peek view mode (e.g., continues to touch one of the icons 404, 406 as the touch screen display transitions from the breathing view 402 to the peek animation image 410 and ultimately to the peek view image 414); (ii) then manipulates the finger 512 to slide upward or downward (e.g., in accordance with either of the arrows 515 of FIG. 5D) until the finger reaches an appropriate one of the image portions of the peek view image corresponding to the hit area that was originally touched (e.g., reaches one of the icons 405, 407 as shown in the peek view image 414), and (iii) then releases the target hit area by removing the finger 512 from and lifting off of the touch screen display (e.g., within some predetermined period of time such as 12 seconds).

Figure 6:
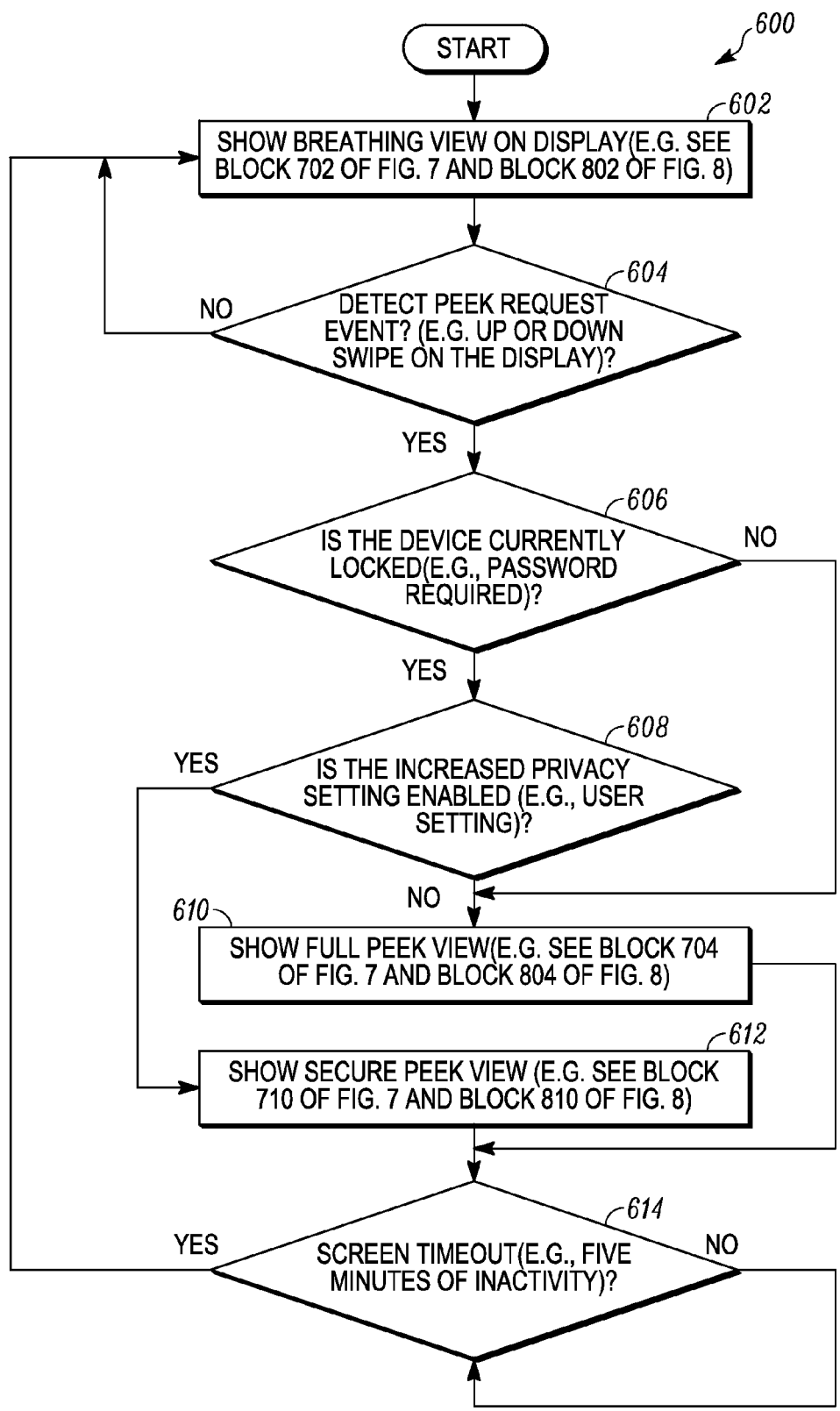
FIG. 6 is a flowchart of an example process for displaying potentially private information.

A flowchart of an example process 600 for displaying potentially private information is illustrated in FIG. 6. The process 600 may be carried out by one or more suitably programmed processors such as a CPU executing software. The process 600 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 600 is described with reference to the flowchart illustrated in FIG. 6, it will be appreciated that many other methods of performing the acts associated with process 600 may be used. For example, the order of many of the operations may be changed, and some of the operations described may be optional.

In general, a computing device 102 that is showing a breathing view on its touch screen display 114, detects a peek request event, such as a swipe on the display 114. Before allowing the user to see potentially private information in response to the peek request, the computing device 102 determines if the computing device 102 is currently locked and if an increased privacy setting is enabled. If the computing device 102 is not locked, or the increased privacy setting is not enabled (even though the computing device 102 may be locked), the computing device 102 shows a full peek view (e.g., some or all of the text from a recent text message). However, if the computing device 102 is locked, and the increased privacy setting is enabled, the computing device 102 shows a secure peek view (e.g., the number of new text messages, but no text from the messages).

In this example, the process 600 begins with the computing device 102 showing the breathing view on the display 114 (block 602). Block 702 of FIG. 7 and block 802 of FIG. 8 show example breathing view displays. While showing the breathing view on the display 114, the computing device 102 determines if a peek request event has occurred (block 604). For example, the user may swipe up or down on the touch screen display 114 in an attempt to view a communication such as a text message. If the computing device 102 determines that a peek request event has not yet occurred (block 604), the computing device 102 continues showing the breathing view on the display 114 (block 602).

If the computing device 102 determines that a peek request event has occurred (block 604), the computing device 102 determines if the computing device 102 is currently locked (block 606). For example, the computing device 102 may require a password, PIN, gesture etc. for authentication. If the computing device 102 is currently locked (block 606), the computing device 102 determines if an increased privacy setting is enabled (block 608). For example, the user may enable or disable the increased privacy setting in a settings area of the computing device 102. Alternatively, for at least certain types of notifications, the user may not be able to choose if the increased privacy setting is enabled or disabled. For example, a device policy may enforce increased privacy.

If the computing device 102 is not locked (block 606), or the increased privacy setting is not enabled (block 608), the computing device 102 shows a full peek view (block 610) in response to detecting the peek request event (block 604). Block 704 of FIG. 7 and block 804 of FIG. 8 show example full peek view displays. If the computing device 102 is locked (block 606), and the increased privacy setting is enabled (block 608), the computing device 102 shows a secure peek view (block 612) in response to detecting the peek request event (block 604). Block 710 of FIG. 7 and block 810 of FIG. 8 show example secure peek view displays. In this example, the display 114 shows one a plurality of application type indicator icons with no additional information. In either case (full peek view or secure peek view), the computing device 102 waits for a predetermined amount of time (block 614) and returns to showing the breathing view on the display 114 (block 602). For example, after five minutes of inactivity, the computing device 102 may return to showing the breathing view on the display 114.

Figure 7:
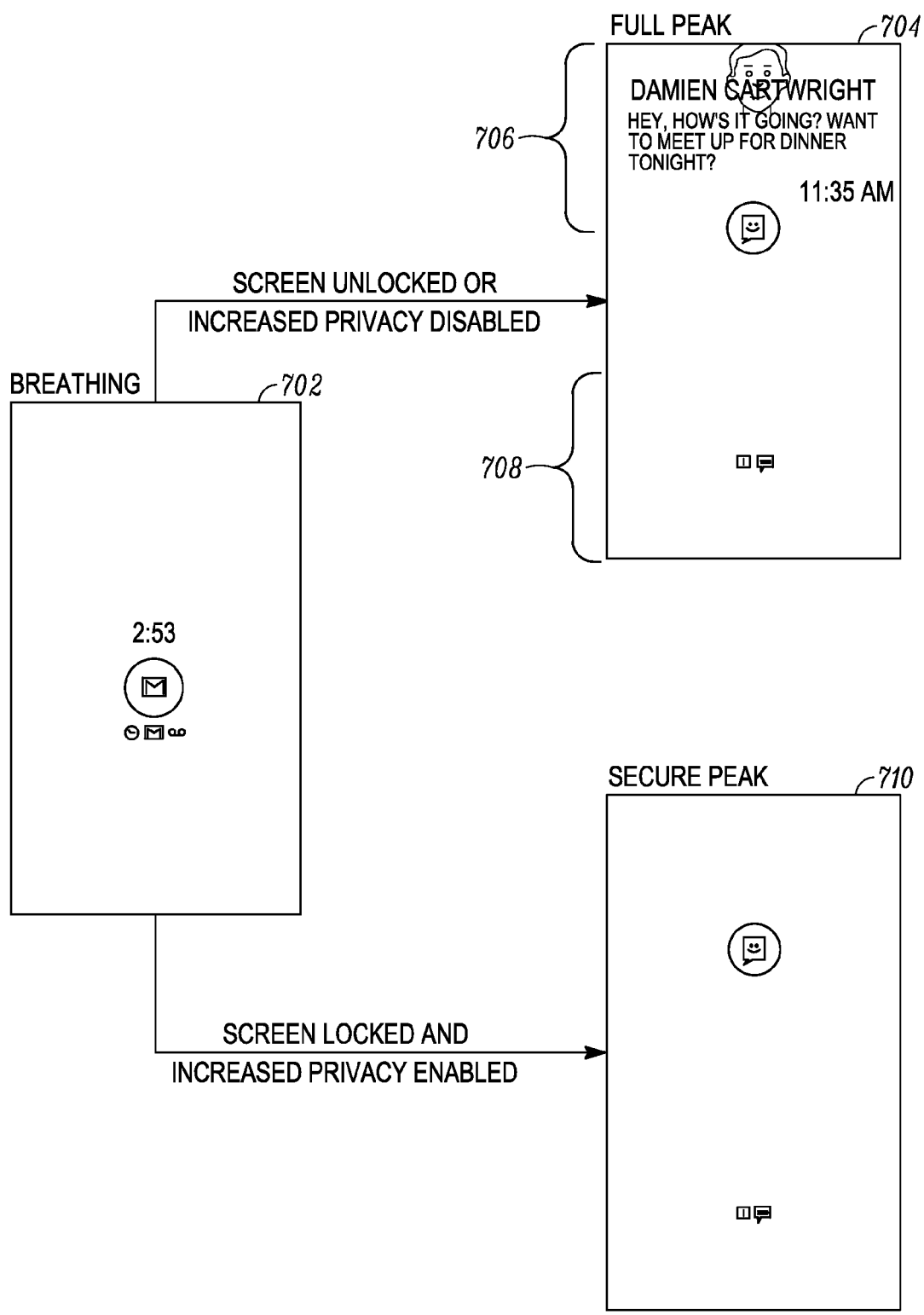
FIG. 7 is series of example screenshots showing operation of a computing device at least in part according to the process of FIG. 6.
Figure 8:
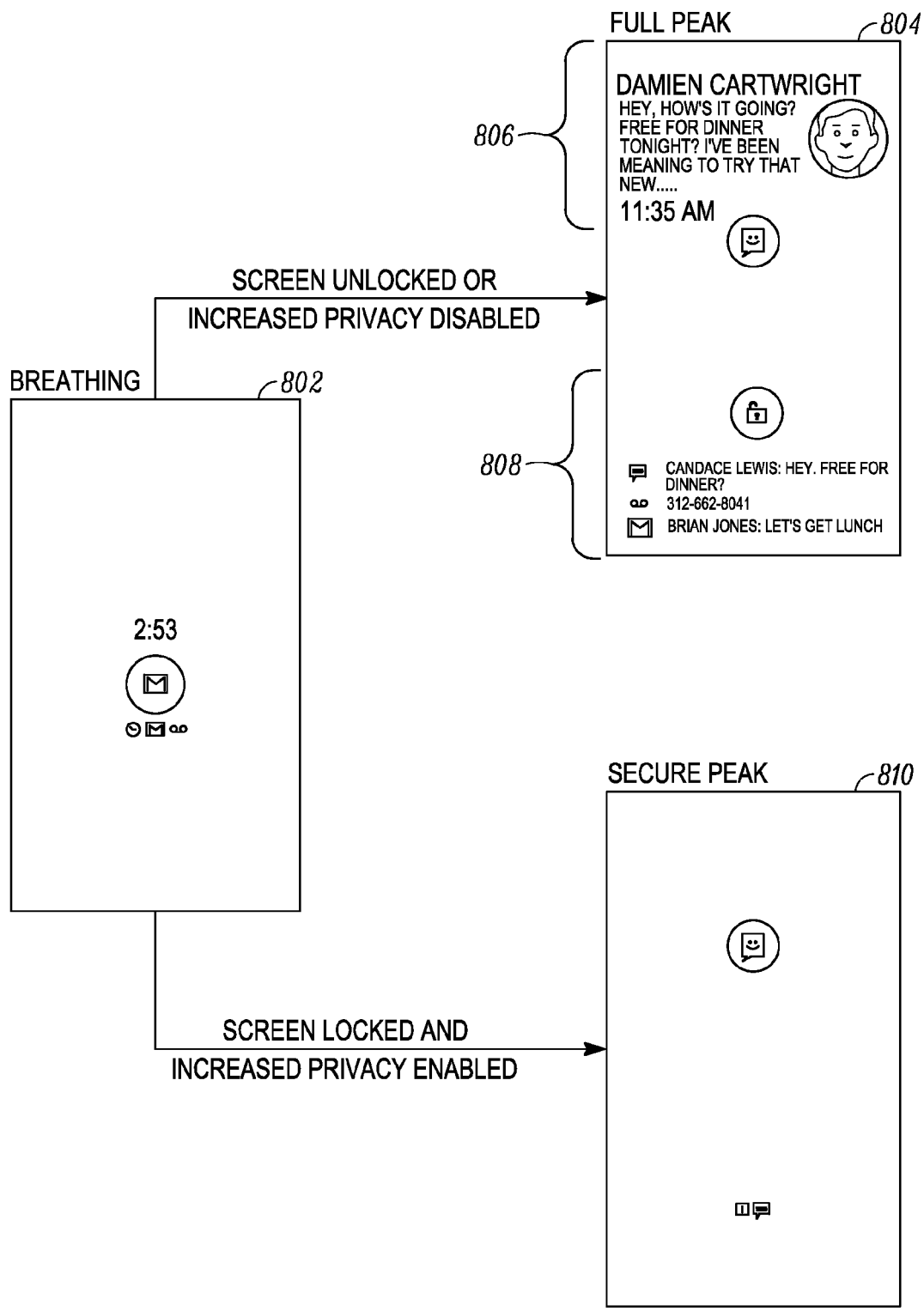
FIG. 8 is another series of example screenshots showing operation of a computing device at least in part according to the process of FIG. 6.

Referring now to FIG. 7, three example views of the touch screen display 114 of the computing device 102 are shown that illustrate example operation of the touch screen display 114 described in the flowchart of FIG. 6. In this example, the computing device 102 is initially showing the breathing view on the display 114 (block 702). When the user attempts to peek (e.g., by swiping up or down on the display 114), the computing device 102 shows the full peek view on the display 114, if the screen is unlocked or the increased privacy setting is disabled (block 704). However, when the user attempts to peek (e.g., by swiping up or down on the display 114), the computing device 102 shows the secure peek view on the display 114, if the screen is locked and the increased privacy setting is enabled (block 710).

The full peek view of block 704 includes a swipe up action 706 and a swipe down action 708. In this example, the swipe up action 706 takes the user to the highest priority message (e.g., Damen Cartwright's text message). In this example, the swipe down action 708 takes the user to a notification drawer. In either case, if the screen is locked, the computing device 102 will first prompt the user for authentication (e.g., password, PIN, gesture, etc.).

Referring now to FIG. 8, three example views of the touch screen display 114 of the computing device 102 are shown that illustrate another example operation of the touch screen display 114 described in the flowchart of FIG. 6. In this example, the computing device 102 is initially showing the breathing view on the display 114 (block 802). When the user attempts to peek (e.g., by swiping up or down on the display 114), the computing device 102 shows the full peek view on the display 114, if the screen is unlocked or the increased privacy setting is disabled (block 804). However, when the user attempts to peek (e.g., by swiping up or down on the display 114), the computing device 102 shows the secure peek view on the display 114, if the screen is locked and the increased privacy setting is enabled (block 810).

The full peek view of block 804 includes a swipe up action 806 and a swipe down action 808. In this example, the swipe up action 806 takes the user to the highest priority message (e.g., Damen Cartwright's text message). In this example, the swipe down action 808 takes the user to the last screen they were on before the phone went to sleep. In either case, if the screen is locked, the computing device 102 will first prompt the user for authentication (e.g., password, PIN, gesture, etc.).

Figure 9:
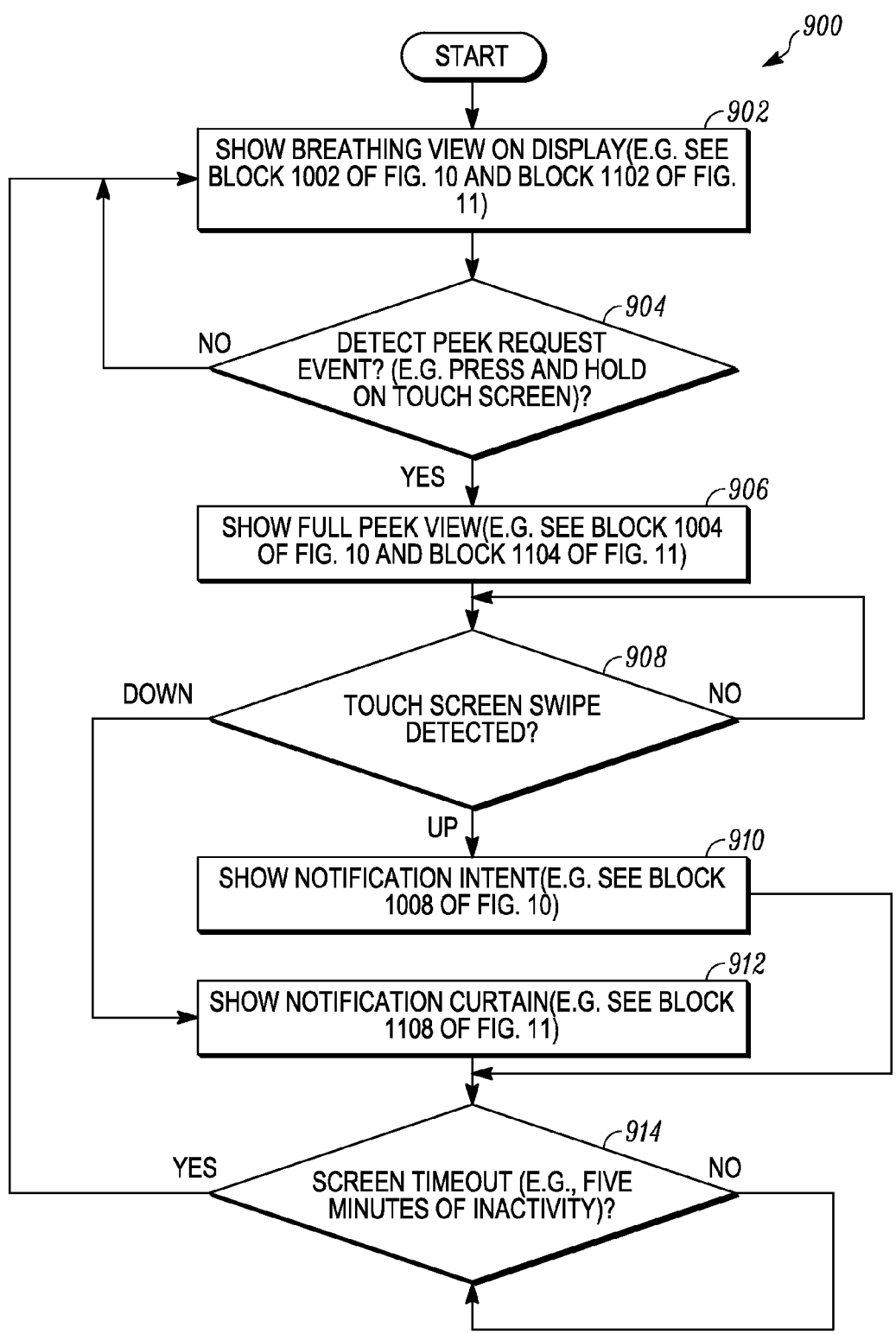
FIG. 9 is a flowchart of an example process for displaying notification information.

A flowchart of an example process 900 for displaying notification information is illustrated in FIG. 9. The process 900 may be carried out by one or more suitably programmed processors such as a CPU executing software. The process 900 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 900 is described with reference to the flowchart illustrated in FIG. 9, it will be appreciated that many other methods of performing the acts associated with process 900 may be used. For example, the order of many of the operations may be changed, and some of the operations described may be optional.

In general, a computing device 102 that is showing a breathing view on its touch screen display 114, detects a peek request event, such as a press and hold on the display 114. If the user then swipes one direction (e.g., up to a notification target), the computing device 102 launches the notification intent (e.g., the full text message in the text messaging application). However, if the user swipes another direction (e.g., down to a plurality of notification icons), the computing device 102 displays a notification curtain (e.g., a list of various notifications and links to each associated application).

Figure 10:
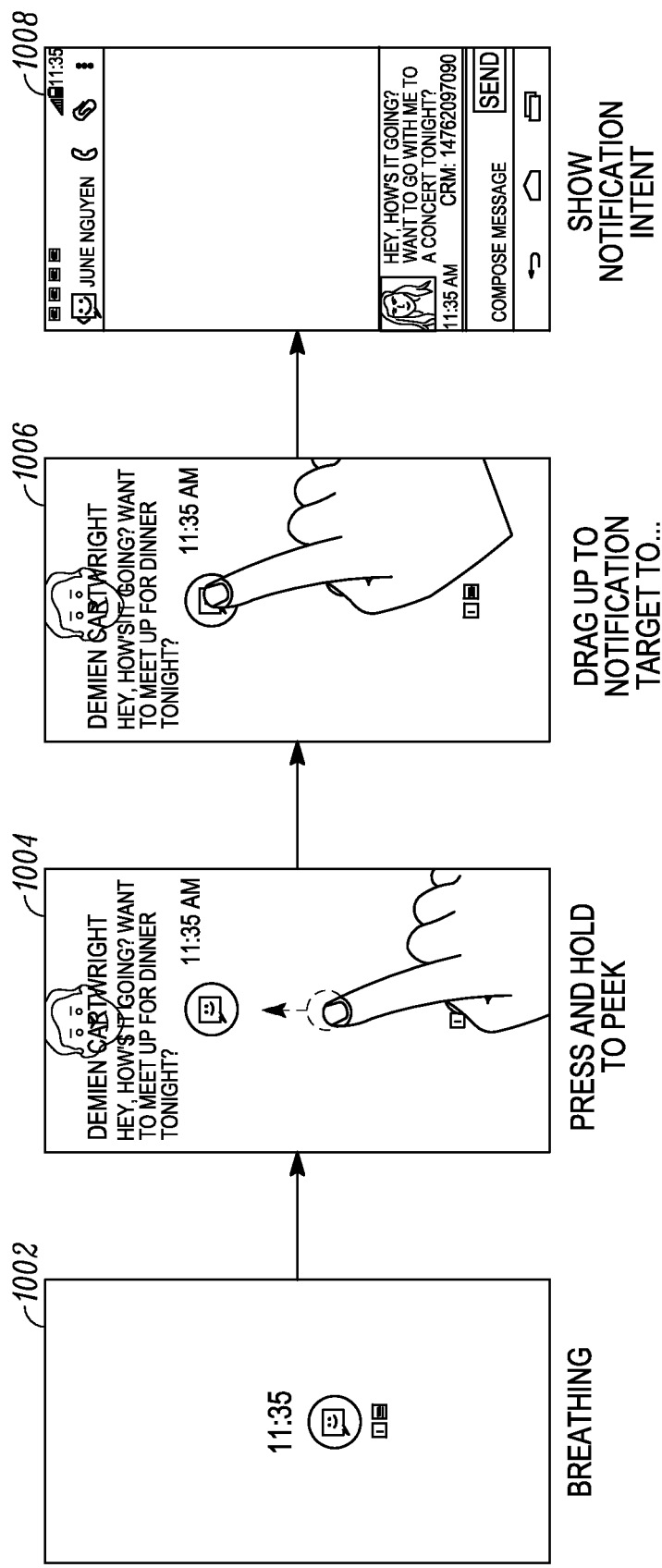
FIG. 10 is series of example screenshots showing operation of a computing device at least in part according to the process of FIG. 9.
Figure 11:
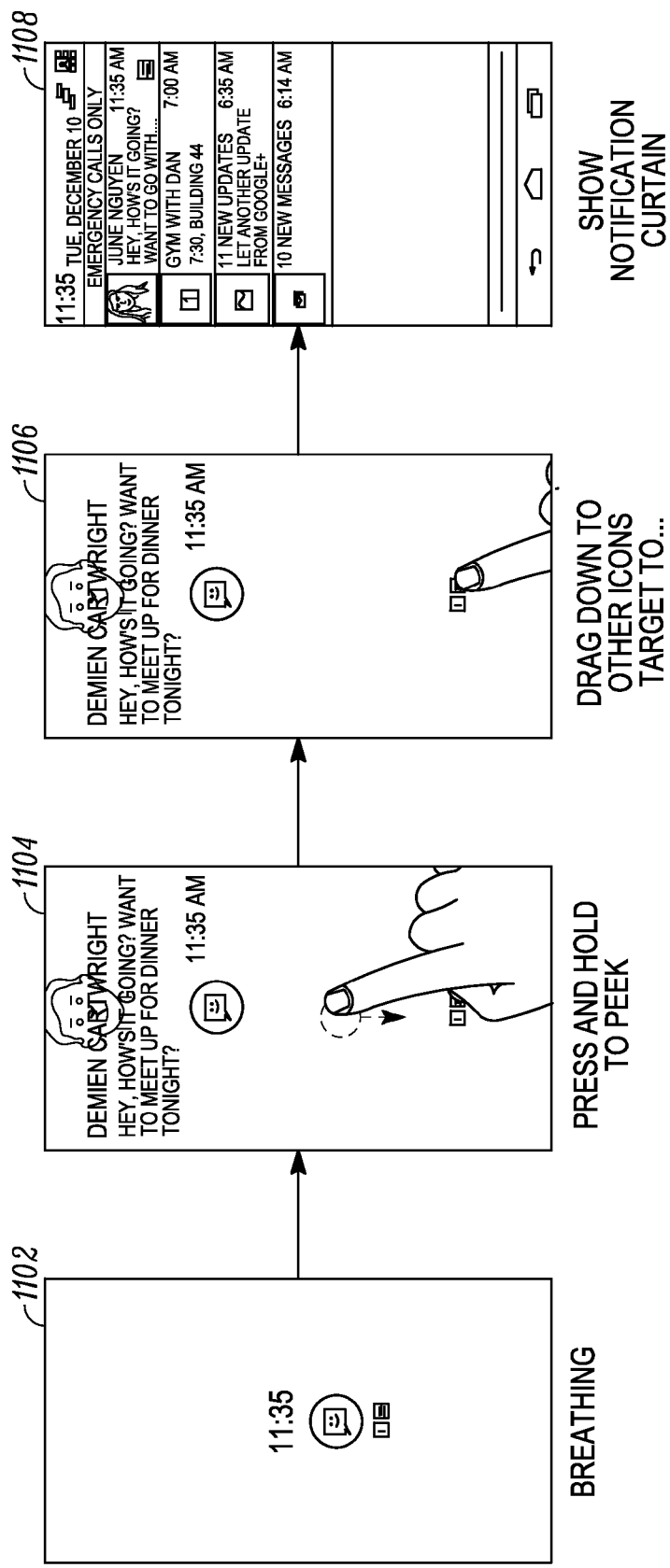
FIG. 11 is another series of example screenshots showing operation of a computing device at least in part according to the process of FIG. 9.

In this example, the process 900 begins with the computing device 102 showing the breathing view on the display 114 (block 902). Block 1002 of FIG. 10 and block 1102 of FIG. 11 show example breathing view displays. While showing the breathing view on the display 114, the computing device 102 determines if a peek request event has occurred (block 904). For example, the user may press and hold on the center of the touch screen display 114. If the computing device 102 determines that a peek request event has not yet occurred (block 904), the computing device 102 continues showing the breathing view on the display 114 (block 902).

If the computing device 102 determines that a peek request event has occurred (block 904), the computing device 102 shows a full peek view (block 906). Block 1004 of FIG. 10 and block 1104 of FIG. 11 show example full peek view displays. While showing the full peek view, the computing device 102 determines if the touch screen display 114 is swiped (block 908).

If a swipe in a first direction is detected (e.g., up to a notification target), the device 102 shows a notification intent view (block 910). Block 1008 of FIG. 10 shows an example of a notification intent view. If the computing device 102 is locked, the computing device 102 may first require authentication. For example, the computing device 102 may require a password, PIN, gesture etc. for authentication. If a swipe in a second direction is detected (e.g., down to a plurality of notification icons), the device 102 shows a notification curtain view (block 912). Block 1108 of FIG. 11 shows an example of a notification curtain view. Again, if the computing device 102 is locked, the computing device 102 may first require authentication.

In either case (notification intent view or notification curtain view), the computing device 102 waits for a predetermined amount of time (block 614) and returns to showing the breathing view on the display 114 (block 602). For example, after five minutes of inactivity, the computing device 102 may return to showing the breathing view on the display 114.

Referring now to FIG. 10, four example views of the touch screen display 114 of the computing device 102 are shown that illustrate example operation of the touch screen display 114 described in the flowchart of FIG. 9. In this example, the computing device 102 is initially showing the breathing view on the display 114 (block 1002). When the user attempts to peek (e.g., by pressing and holding down on the display 114), the computing device 102 shows the full peek view on the display 114 (block 1004). If the user swipes up to the notification target (block 1006), the computing device 102 shows the notification intent view (block 1008). If the computing device 102 is locked, the computing device 102 may first require authentication.

Referring now to FIG. 11, four example views of the touch screen display 114 of the computing device 102 are shown that illustrate another example operation of the touch screen display 114 described in the flowchart of FIG. 9. In this example, the computing device 102 is initially showing the breathing view on the display 114 (block 1102). When the user attempts to peek (e.g., by pressing and holding down on the display 114), the computing device 102 shows the full peek view on the display 114 (block 1104). If the user swipes down to the plurality of notification icons (block 1106), the computing device 102 shows the notification curtain view (block 1108). Again, if the device 102 is locked, the computing device 102 may first require authentication.

Figure 12:
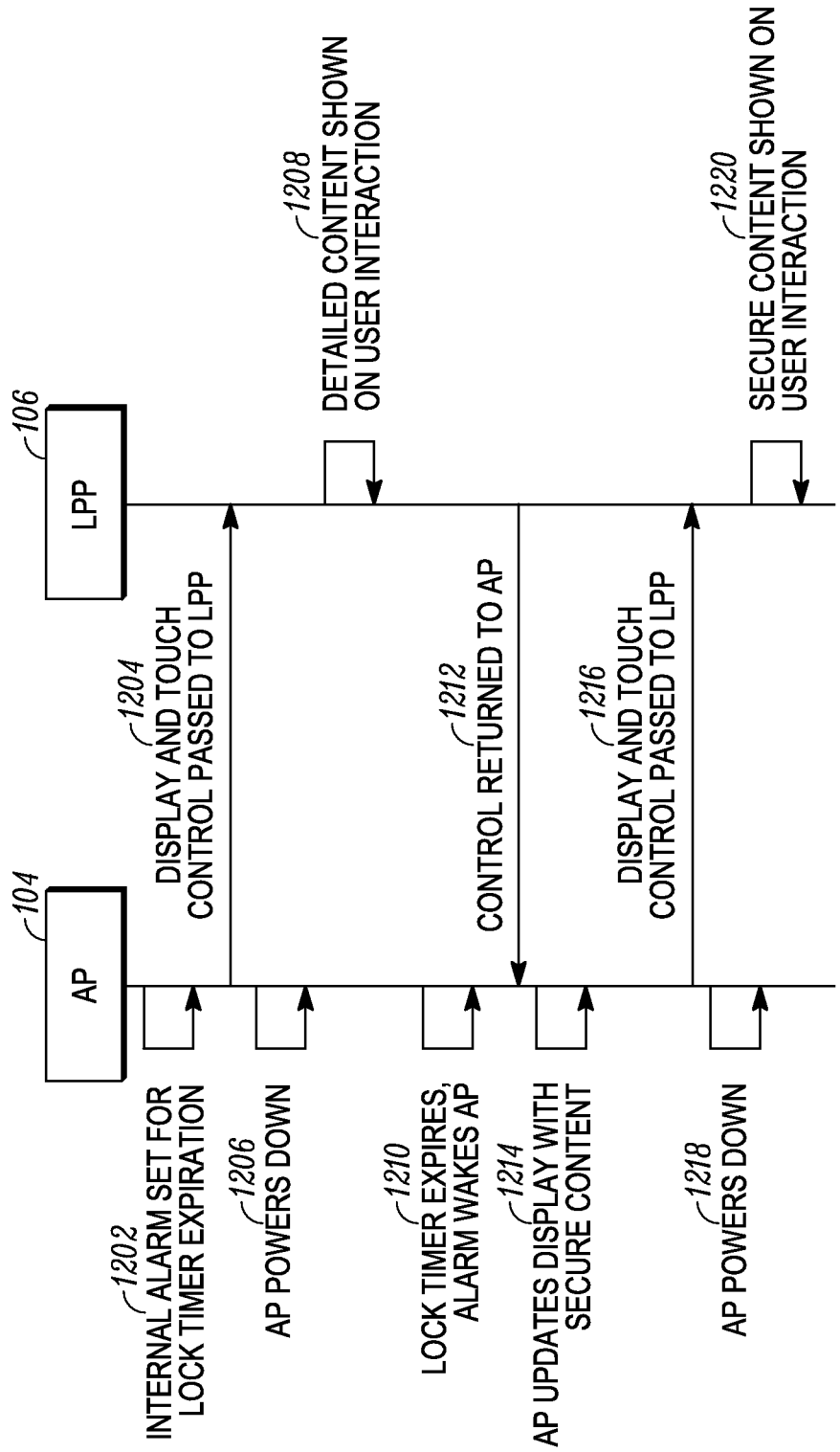
FIG. 12 is a ladder diagram showing an example of two processors sharing control of a display.

FIG. 12 is a ladder diagram showing an example of two processors sharing control of a display 114. For the behavior described in FIG. 12 certain initial conditions are assumed including (i) the increased privacy setting is enabled, (ii) the computing device 102 is locked with some form of authentication required (e.g., a password), (iii) the computing device 102 is in an unlocked state, and (iv) notifications are available for display by the low power processor 106.

In this example, the application processor 104 sets an internal alarm for lock timer expiration (block 1202). For example, based on user settings, after five minutes of inactivity, the application processor 104 may set the lock timer expiration alarm for five additional minutes. The application processor 104 then passes display and touch control to the low power processor 106 (block 1204) and shuts down to conserve battery power (block 1206). During this time period, if the user interacts with the display, more detailed information is displayed (block 1208). For example, if the user peeks, some or all of the text of the most recent text message may be shown along with the sender's name and picture if available (e.g., see block 704 of FIG. 7 and block 804 of FIG. 8).

When the lock timer expires, the associated alarm wakes the application processor 104 (block 1210). At this time, the low power processor 106 returns display and touch control to the application processor 104 (block 1212). The application processor 104 then updates the display with secure content (block 1214). For example, the application processor 104 may put the computing device 102 in to the breathing mode described in detail above (e.g., see block 702 of FIG. 7 and block 802 of FIG. 8).

The application processor 104 then passes display and touch control back to the low power processor 106 (block 1216) and shuts down to conserve battery power again (block 1218). During this time period, if the user interacts with the display, less detailed information is displayed (block 1220). For example, if the user attempts to peek, no additional information may be shown to the user (e.g., see block 710 of FIG. 7 and block 810 of FIG. 8).

Figure 13:
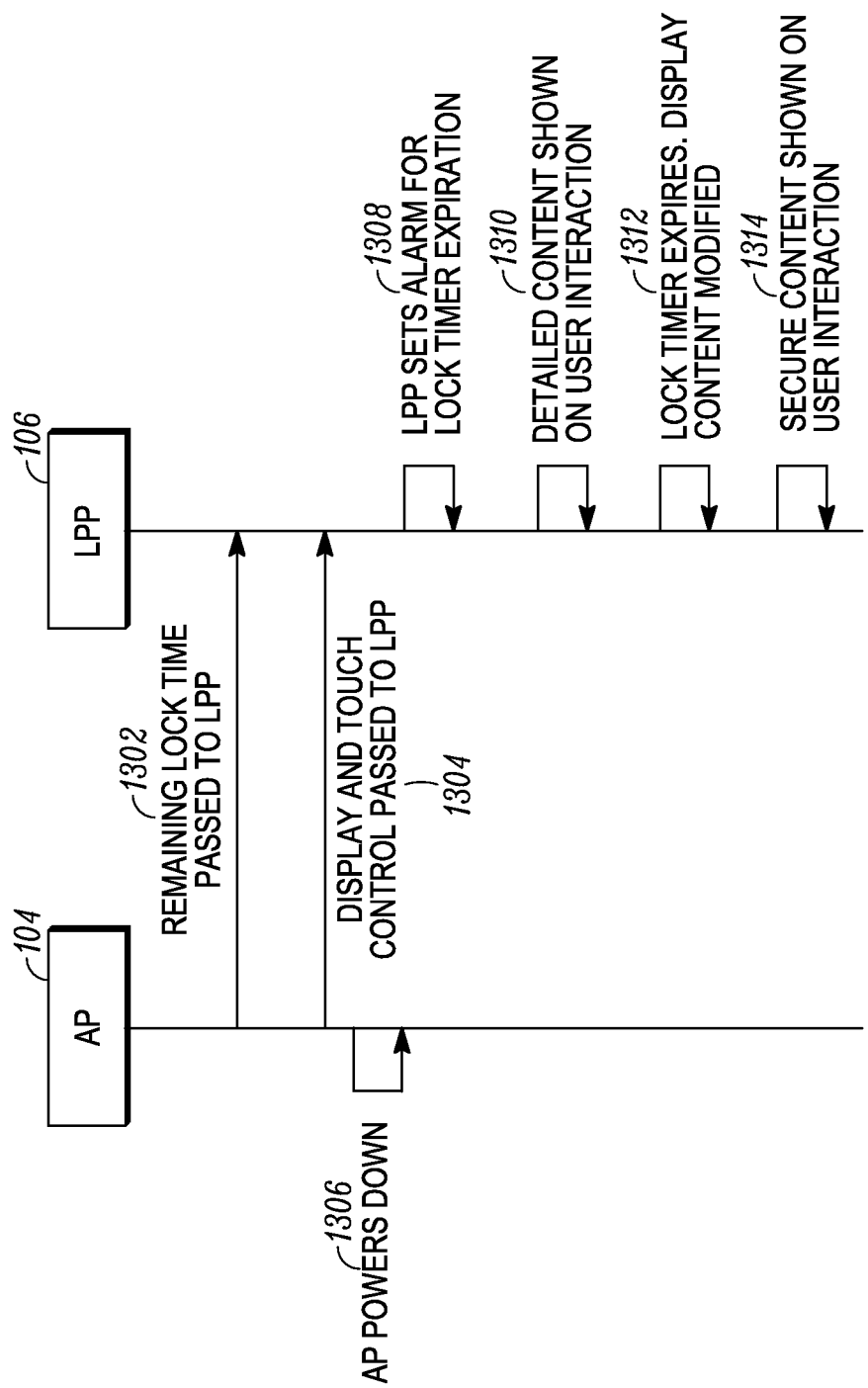
FIG. 13 is another ladder diagram showing an example of two processors sharing control of a display.

FIG. 13 is a ladder diagram showing another example of two processors sharing control of a display 114. For the behavior described in FIG. 13 certain initial conditions are assumed including (i) the increased privacy setting is enabled, (ii) the computing device 102 is locked with some form of authentication required (e.g., a password), (iii) the computing device 102 is in an unlocked state, and (iv) notifications are available for display by the low power processor 106.

In this example, the application processor 104 passes the remaining lock time to the low power processor 106 (block 1302). For example, based on user settings, after five minutes of inactivity, the application processor 104 may pass data indicative of five additional minutes of remaining lock time to the low power processor 106. The application processor 104 then passes display and touch control to the low power processor 106 (block 1304) and shuts down to conserve battery power (block 1306).

The low power processor 106 then sets an internal alarm for lock timer expiration (block 1308). For example, based on data sent from the application processor 104, the low power processor 106 may set the lock timer expiration alarm for five additional minutes. During this time period, if the user interacts with the display, more detailed information is displayed (block 1310). For example, if the user peeks, some or all of the text of the most recent text message may be shown along with the sender's name and picture if available (e.g., see block 704 of FIG. 7 and block 804 of FIG. 8).

When the lock timer expires, the low power processor 106 updates the display with secure content (block 1312). For example, the low power processor 106 may put the computing device 102 in to the breathing mode described in detail above (e.g., see block 702 of FIG. 7 and block 802 of FIG. 8). During this time period, if the user interacts with the display, less detailed information is displayed (block 1314). For example, if the user attempts to peek, no additional information may be shown to the user (e.g., see block 710 of FIG. 7 and block 810 of FIG. 8).

In summary, persons of ordinary skill in the art will readily appreciate that methods and apparatus for displaying potentially private information have been provided. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method comprising:
    while a computing device is operating in a sleep mode:
        causing, by a display manager component of the computing device, a low-power processor of the computing device to display, at a display, initial information, wherein the display manager component is hardware logic or circuitry that is separate from the low-power processor and an application processor of the computing device;
        responsive to receiving data, causing, by the display manager component, the application processor to write, at one or more registers of the display manager component, a first version of information associated with the data and a second, different version of the information associated with the data, wherein the second version includes more of the information associated with the data received by the computing device than the first version; and
        responsive to a peek request event being detected while displaying the initial information, causing, by the display manager component, the low-power processor of the computing device to display, at the display, either the first version of the information or the second version of the information by at least:
            determining whether the computing device is locked or unlocked;
            determining whether a privacy setting of the computing device is in a first state or a second state;
            responsive to determining that the computing device is locked and the privacy setting of the computing device is in the first state, displaying the first version of the information; and
            responsive to determining that the computing device is unlocked or the privacy setting is in a second, different state, displaying the second version of the information.

2. The method of claim 1, wherein the information associated with the data is rendered while:
    the application processor is awake,
    the low-power processor displays the initial information at the display, and
    the computing device is operating in the sleep mode.

3. The method of claim 1, wherein the first version of the information comprises a subset of the second version of the information.

4. The method of claim 1, wherein the first version of the information is an application type indicator with no additional information.

5. The method of claim 1, wherein the second version of the information is further caused to be displayed in response to receiving a first user interaction with the computing device.

6. The method of claim 5, further comprising: causing, by the display manager component, the low-power processor to display, at the display, a plurality of notifications associated with two or more applications in response to a second different user interaction with the computing device.

7. The method of claim 5, comprising: causing, by the display manager component, the low-power processor to display, an unlock screen responsive to a second different user interaction with the computing device.

8. The method of claim 1, wherein the initial information includes a breathing view image that periodically becomes visible and then disappears.

9. The method of claim 1, wherein the peek request event includes a user gesture associated with the computing device.

10. A computing device comprising:
    a first processor;
    a second processor, the second processor being a lower power processor than the first processor;
    a wireless receiver operatively coupled to the first processor;
    a display operatively coupled to the first processor and the second processor; and
    a display manager component comprising one or more registers, wherein the display manager component is hardware logic or circuitry that is separate from the first processor and is separate from the second processor, the display manager component being configured to, while the computing device is operating in a sleep mode:
        cause the second processor of the computing device to display, at the display, initial information;
        responsive to the wireless receiver receiving data, cause the first processor to write, at the one or more registers, a first version of information associated with the data and a second, different version of the information associated with the data, wherein the second version includes more of the information associated with the data received by the computing device than the first version; and
        responsive to a peek request event being detected while the second processor displays the initial information, cause the second processor of the computing device to display, at the display, either the first version of the information or the second version of the information by at least:
            determining whether the computing device is locked or unlocked;
            determining whether a privacy setting of the computing device is in a first state or a second state;
            responsive to determining that the computing device is locked and the privacy setting of the computing device is in the first state, displaying the first version of the information; and responsive to determining that the computing device is unlocked or the privacy setting is in a second, different state, displaying the second version of the information.

11. The computing device of claim 10, wherein the display manager component is further configured to render the information associated with the data while:
the first processor is awake,
the second processor displays the initial information at the display, and
the computing device is operating in the sleep mode.

12. The computing device of claim 10, wherein the first version of the information comprises a subset of the second version of the information.

13. The computing device of claim 10, wherein the first version of the information is an application type indicator with no additional information.

14. The computing device of claim 10, wherein display manager component is further configured to cause the second version of the information to be displayed in response to receiving a first user interaction with the computing device.

15. The computing device of claim 14, wherein display manager component is further configured to cause the second processor to display, at the display, a plurality of notifications associated with two or more applications in response to a second different user interaction with the computing device.

16. The computing device of claim 14, wherein display manager component is further configured to cause the second processor to display, at the display, an unlock screen responsive to a second different user interaction with the computing device.

17. The computing device of claim 10, wherein the initial information includes a breathing view image that periodically becomes visible and then disappears.

18. The computing device of claim 10, wherein the peek request event includes a user gesture associated with the computing device.

19. A display manager component of a computing device configured to:
while the computing device is operating in a sleep mode:
cause a second processor of the computing device to display, at a display, initial information;
responsive to receiving data, cause a first processor to write, at one or more registers of the display manager, a first version of information associated with the data and a second, different version of the information associated with the data, wherein the second version includes more of the information associated with the data received by the computing device than the first version; and
responsive to a peek request event being detected while displaying the initial information, cause the second processor of the computing device to display, at the display, either the first version of the information or the second version of the information by at least:
determining whether the computing device is locked or unlocked;
determining whether a privacy setting of the computing device is in a first state or a second state;
responsive to determining that the computing device is locked and the privacy setting of the computing device is in the first state, displaying the first version of the information; and
responsive to determining that the computing device is unlocked or the privacy setting is in a second, different state, displaying the second version of the information,
wherein the display manager component is hardware logic or circuitry that is separate from the first processor and is separate from the second processor.

20. The display manager component of claim 19, wherein the display manager component is further configured to render the information associated with the data while:
the first processor is awake,
the second processor displays the initial information at the display, and
the computing device is operating in the sleep mode.

21. The display manager component of claim 19, wherein the first version of the information comprises a subset of the second version of the information.

22. The display manager component of claim 19, wherein the first version of the information is an application type indicator with no additional information.

23. The display manager component of claim 19, wherein the display manager component is further configured to cause the second version of the information to be displayed in response to receiving a first user interaction with the computing device.

24. The display manager component of claim 23, wherein the display manager component is further configured to cause the second processor to display, at the display, a plurality of notifications associated with two or more applications in response to a second different user interaction with the computing device.

25. The display manager component of claim 19, wherein the display manager component is further configured to cause the second processor to display, at the display, an unlock screen responsive to a second different user interaction with the computing device.

26. The display manager component of claim 19, wherein the initial information includes a breathing view image that periodically becomes visible and then disappears.

27. The display manager component of claim 19, wherein the peek request event includes a user gesture associated with the computing device.

* * * * *